United States Patent [19]

Machacek

[11] Patent Number: 4,893,708

[45] Date of Patent: Jan. 16, 1990

[54] CONVEYOR FOR FREEZING FOOD PACKAGES

[75] Inventor: David G. Machacek, Northfield, Minn.

[73] Assignee: Northfield Equipment and Manufacturing Co., Inc., Northfield, Minn.

[21] Appl. No.: 246,636

[22] Filed: Sep. 20, 1988

[51] Int. Cl.[4] .............................................. B65G 21/18
[52] U.S. Cl. ...................................... 198/778; 198/841
[58] Field of Search ................................. 198/778, 841

[56] References Cited

U.S. PATENT DOCUMENTS

| | | |
|---|---|---|
| 1,047,273 | 12/1912 | Morris . |
| 2,271,091 | 1/1942 | Pecker et al. . |
| 2,933,179 | 4/1960 | Hirs . |
| 3,348,659 | 10/1967 | Roinestad . |
| 3,536,183 | 10/1970 | Locke . |
| 3,664,487 | 5/1972 | Ballenger . |
| 3,826,352 | 7/1974 | Van Zon et al. . |
| 3,857,476 | 12/1974 | Heifetz et al. . |
| 3,880,276 | 4/1975 | Willet, III ...................... 198/778 X |
| 3,904,025 | 9/1975 | Garvey . |
| 4,023,381 | 5/1977 | Onodera . |
| 4,078,655 | 3/1978 | Roinestad . |
| 4,103,768 | 8/1978 | Persson . |
| 4,448,301 | 5/1984 | Alger . |
| 4,450,953 | 5/1984 | Le Cann et al. . |

Primary Examiner—Robert J. Spar
Assistant Examiner—D. Glenn Dayoan
Attorney, Agent, or Firm—Haugen & Nikolai

[57] ABSTRACT

A conveyor assembly for use in the continuous freezing of food articles and comprising a generally coaxially arranged cylindrical core with an outer annular cylindrical shell, the annular shell defining an annular thermal treating or freezing zone. An endless spirally-arranged conveyor track creates a support platform or base for the material being treated, such as the food being frozen, and travels along a path within the annular freezing zone. The conveyor track is supported by a plurality of axially and radially spaced apart unitary support arms secured to the outer wall surface so as to support and guide the conveyor along a predetermined spiral path or course through the annular freezing zone. Each of the support brackets has a certain constant height dimension from root to tip and a generally frusto-conical width dimension tapering inwardly from the root to the tip so as to provide a stable support with a low dimensional profile. The stresses induced in the support arms upon normal loading of the track with product being treated or frozen is generally constant from root to tip.

5 Claims, 3 Drawing Sheets

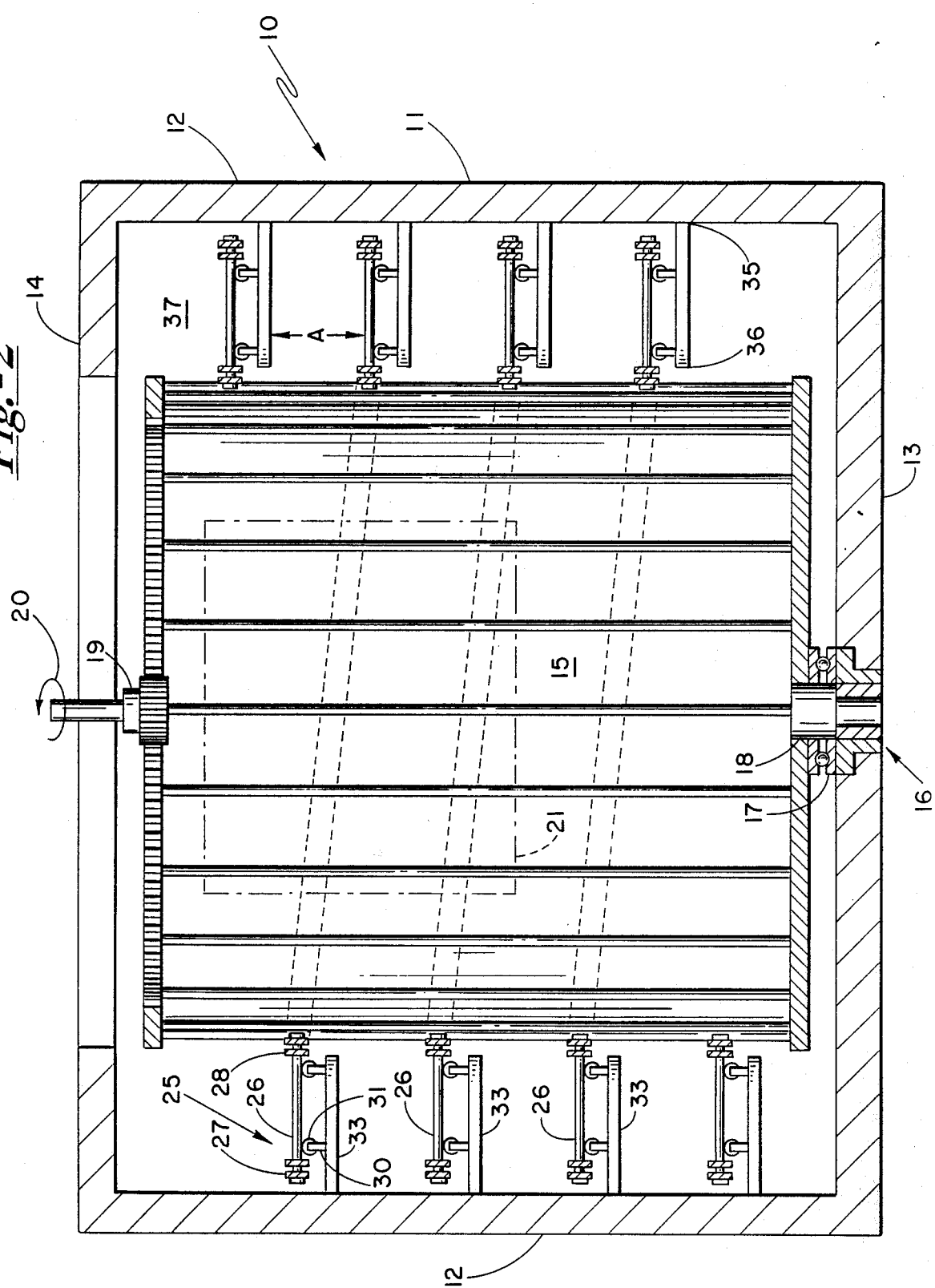

CONVEYOR FOR FREEZING FOOD PACKAGES

BACKGROUND OF THE INVENTION

The present invention relates generally to an improved conveyor assembly for use in the thermal treatment of certain articles, and particularly for the continuous freezing of food articles, and more particularly to a support means for such a conveyor wherein the generally horizontally disposed support arms are designed to be as compact as possible in their thickness or height dimension so as to provide a maximum free-space or inter-flight dimensional opening or spacing. In this fashion, the design provides for an endless spirally-arranged conveyor track traveling about a predetermined path, the arrangement being such that the conveyor establishes a support platform or base with multiple flights or turns, tightly arranged about an axially ascending or descending path within the annular freezing zone. The endless conveyor track is supported on a plurality of axially and radially spaced apart unitary support arms, and thereby guide the conveyor along its predetermined spiral path or course.

In the past, upright spiral conveyors have been utilized for handling articles being subjected to thermally modifying environments, such as extremely low temperatures for the purposes of rapidly freezing food packages. These systems have been used for providing the chilling or even cryogenic environment for rapid freezing of food packages destined for use in either commercial markets, consumer markets, or both markets. The methods or techniques involved include exposure of the individual packages to extremely low temperatures, and with the time of exposure being a function of the temperature maintained within the freezing zone and the thermal treatment desired. The individual articles will have a dwell time which is dependent upon the temperature of the freezing zone and the characteristics of the articles being frozen. The efficiency of the system will be determined, to a great extent, upon the packing or stacking density of the articles within the system, with the space or volume efficiency being directly proportional to the packing or stacking density. Also, the external surface of the apparatus will determine operational efficiency, with thermal losses being, of course, influenced by the external surface required for the system. Thus, as the packing or stacking density is increased, the overall efficiency will be increased as well, since the other parameters of the apparatus are generally fixed and/or constant. The specific design feature or operational parameter which is improved and enhanced by the design of the present invention is the design of the support arms being employed to create and/or define the path of travel for the conveyor track within the annular thermal treating or freezing zone.

SUMMARY OF THE INVENTION

Spiral conveyors for the handling of articles or packages to be frozen generally include a conveyor assembly which carries the articles to be frozen through a freezing zone. Specifically, the system of the present invention comprises a generally coaxially arranged cylindrical core and outer annular cylindrical shell, with the shell defining an annular freezing zone therebetween. An endless spirally-arranged conveyor track creates a support platform or base for the food articles being frozen, with the track traveling along a spirally arranged path within the freezing zone so created. The conveyor track is supported by a plurality of axially and radially spaced apart unitary support arms secured to the outer wall surface so as to support and guide the endless conveyor along a predetermined spiral path or course. The cylindrical shell is provided with inlet and outlet ports so as to provide for ingress and egress of product through the system.

In the annular freezing zone, there are a plurality of superimposed flights defined by the spirally-arranged track. The sum total of the support brackets for the track provide and define the path for the track. Each bracket has a certain constant height dimension from root to tip, and a generally frusto-conical width dimension tapering inwardly from the root to the tip so as to provide a stable support with a low dimensional profile and with low deflection under load. The inter-flight spacing or opening has a maximum dimension, therefore, with the strength for the support bracket being provided by the design which includes the frusto-conical width profile. The stresses induced in the support arms upon normal loading of the track with product is maintained at a generally constant magnitude from root to tip. In this manner, therefore, the deflection of the tip upon loading is maintained at a level so as to be consistent with design parameters, with the design being such that the maximum stresses in the bracket design of the present invention are less than in the support arms of the conventional design.

Therefore, it is a primary object of the present invention to provide an improved conveyor assembly which is particularly adapted for use in the thermal treatment of articles such as the freezing of food articles on a continuous basis, and which provides an efficient design with maximum dwell time for the product consistent with minimum external dimensions for the overall system.

It is yet a further object of the present invention to provide an improved conveyor assembly particularly adapted for use in the continuous freezing of food articles on a continuous rotary, and inclined spiral path, and wherein the inter-flight dimensional opening or spacing is at a maximum due to improved design of support arms throughout the system.

Other and further objects of the present invention will become apparent to those skilled in the art upon a study of the following specification, appended claims, and accompanying drawings.

IN THE DRAWINGS

FIG. 1 is a perspective view of the outer annular shell of a conveyor system for utilization in a freezer for frozen food packages, and illustrating the device with the chilling unit removed therefrom, it being that the compressor and/or chilling unit is commonly located outside of the conveyor drum, but because of the limitation in draftsmanship and for purposes of illustration, the chilling unit is illustrated inwardly of the conveyor;

FIG. 2 is a vertical sectional view taken generally through the diameter of the internal portions of the system, and illustrating the relative positioning and dispositions of the compressor and chilling unit, along with the spirally-arranged internal conveyor portion and support arms therefor;

Figure 3:
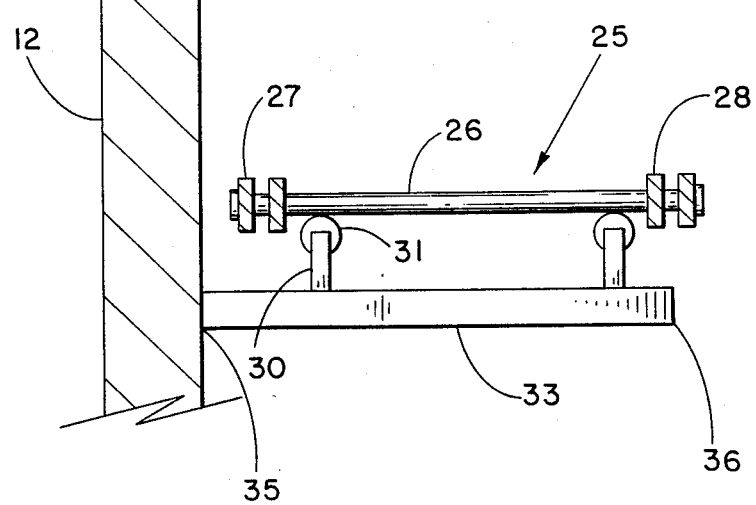
FIG. 3 is a detailed partial view showing one segment of the conveyor support, and with other portions of the system being broken away, with FIG. 3 being shown on a slightly enlarged scale.
Figure 4:
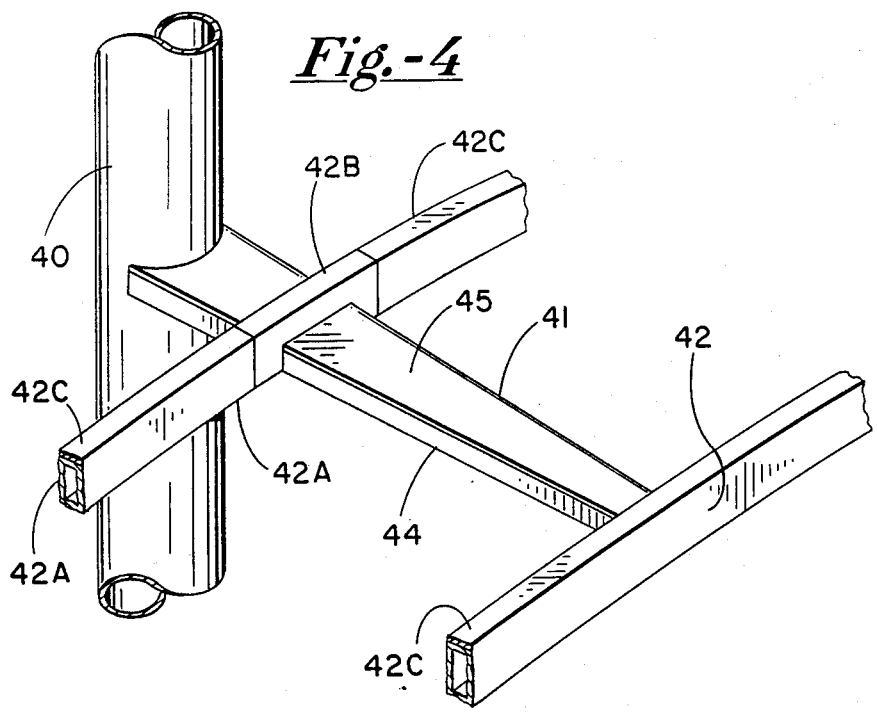
Figure 5:
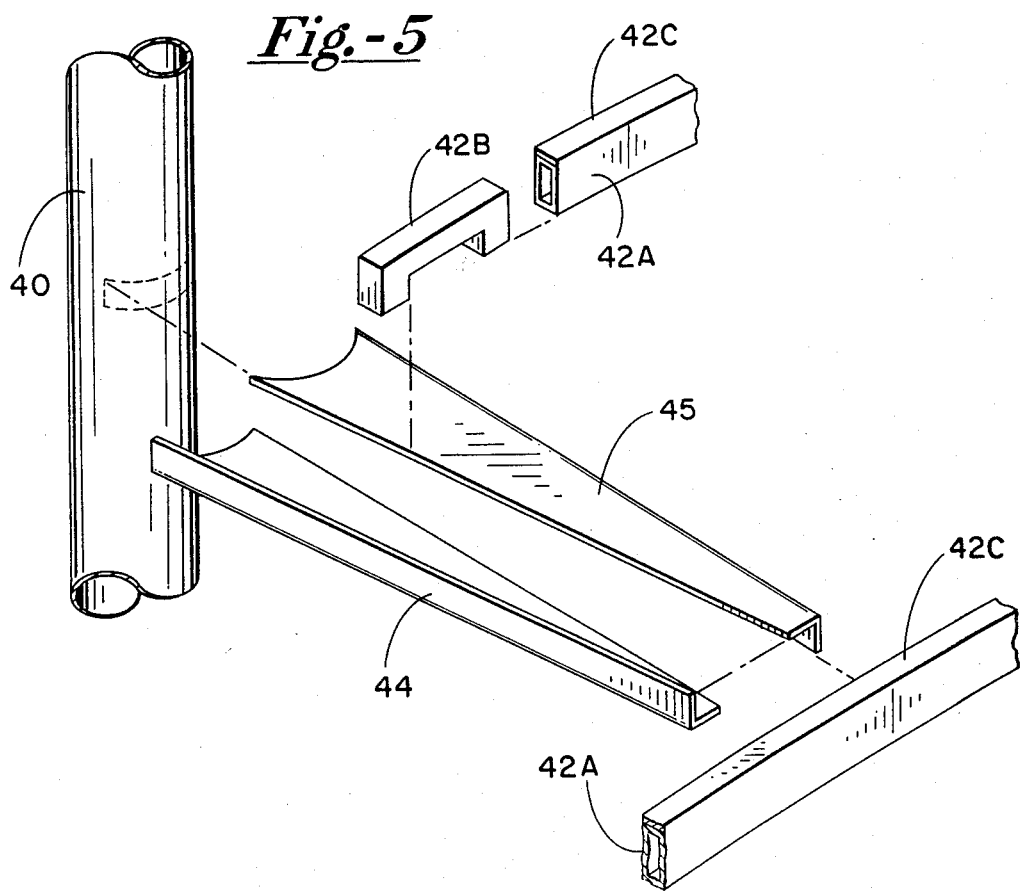

FIG. 4 is a partial perspective view of a portion of a support system for the conveyor support track of the present invention, and illustrating the outer conveyor support and arms of the present invention, and with FIG. 4 showing a slightly modified form of the structure of FIGS. 2 and 3, and with Figure 4 being shown on an enlarged scale; and FIG. 5 is an exploded view of the support arm of the present invention, and illustrating the components utilized in forming the track support arm shown in FIGS. 2-4, and with FIG. 5 being shown on an enlarged scale.

DESCRIPTION OF THE PREFERRED EMBODIMENT

In accordance with the preferred embodiment of the present invention, and with particular attention being directed to FIGS. res 1, 2, 3 and 5 of the drawings, the freezing unit of the present invention, generally designated 10, includes outer shell or frame means 11 including an annular ring or shroud 12 together with a base 13 and top portion 14 coupled together to form an outer enclosure. An inner drum or cylindrical element is illustrated generally at 15, with inner drum member 15 being journaled for rotation within shell 11. Typically, the conveyor belt is frictionally driven along its inner edge by rotation of inner drum 15 such as by the capstan wheel in a capstan-type of winch. Appropriate bearing assemblies are illustrated generally at 16, and include a bearing 17 along with shafts 18 and 19, accommodating rotation of member 15 in the direction of the arrow 20.

Drum element 15 houses a compressor and/or chilling unit 21, with the compressor and/or chilling unit providing the means for extracting heat from the material to be frozen within the assembly. The capacity of compressor and/or chilling unit is specified in accordance with the requirements of the overall system. While the device described herein is characterized as a freezing unit, it will be appreciated that other forms of devices of the present invention may be designed for use with other forms of thermal treatment as well. For example, the system may be utilized for proofing of edible baked products, along with heating, drying, and/or steaming of materials other than food such as plastic assemblies. The system may also be utilized for the thermal treatment of glass articles fabricated from glass such as plate glass, bottles and the like. As indicated earlier, compressor and/or chilling unit 21 may be located or disposed outwardly of the drum element 15.

Endless conveyor generally designated 25 is provided to support and carry product to be frozen throughout the system. Conveyor 25 is in the form of an endless chain as at 26, having connecting links 27-27 and 28-28 arranged on the outer edges thereof. A supporting track and glide arrangement are illustrated at 30 and 31 respectively for assisting in free movement of the conveyor 25 through the system.

A plurality of support arms are provided as at 33-33, these arms being axially and radially spaced throughout the system, and supported on the frame work which forms the outer shell 11. Support arms 33-33 are anchored, such as by welding or the like so as to become part of an overall weldment if desired. Other mounting techniques may, of course, be utilized or appropriate.

The configuration of support arms 33-33 is selected so as to provide the maximum inter-flight dimensional opening or spacing between adjacent flights comprising the spiral path. This inter-flight dimension is shown at "A" in FIG. 2. Specifically, the support arms have a certain constant height dimension from root to tip, such as from root 35 to tip 36, along with a generally trapezoidal or frusto-conical width dimension tapering inwardly from root to tip respectively. This arrangement provides a stable support with a low dimensional profile.

In the arrangement as illustrated in FIG. 2, an annular freezing zone is illustrated generally at 37, with this annular freezing zone being disposed outwardly of cylindrical arrangement 15, and inwardly of outer shroud 11. It is through this annular zone that the product moves in order to have heat extracted therefrom so as to cause freezing of the product.

Figure 1:
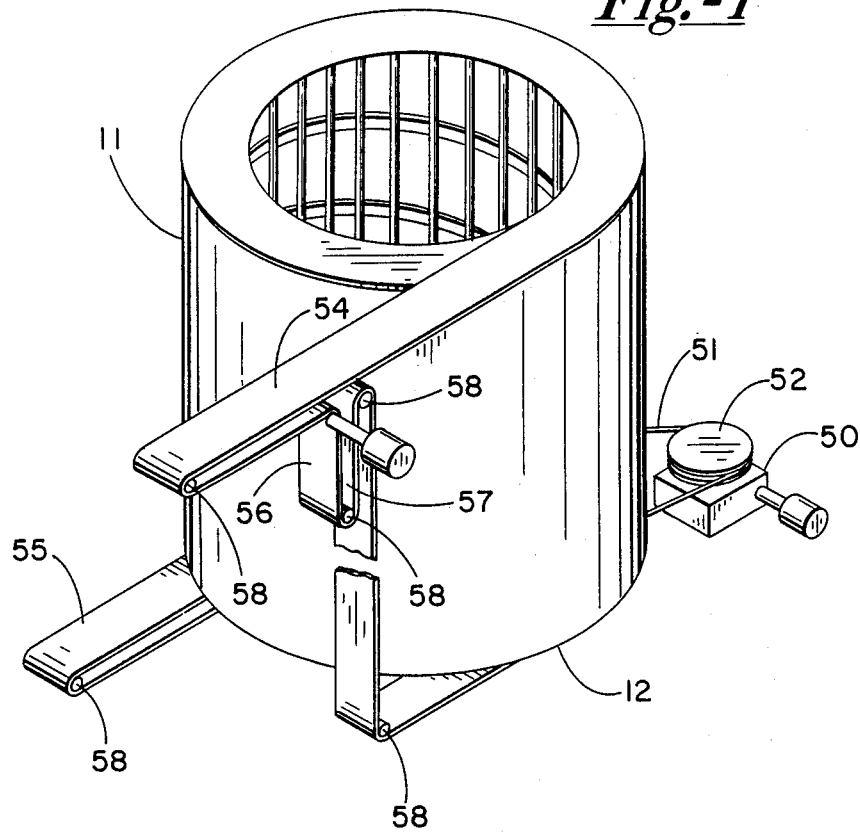

With specific attention being directed to FIG. 1 of the drawings, the overall belt path is shown in greater detail. The cage or drive motor is illustrated as at 50, with a drive belt being illustrated at 51, with drive belt 51 being driven by motor pulley 52. Endless conveyor belt 25 is shown with ingress or lead-in span or section being shown at 55, and with egress section or segment being shown at 54. A slack loop is provided as at 56, in order to appropriately detect and monitor tension throughout the belt. A slack loop is shown at 57, with slack loop probes being utilized, as is conventional in the systems, if desired. Appropriate idlers are positioned throughout the system to appropriately track the endless conveyor belt, with these idlers being illustrated at 58-58.

With attention now being directed to FIG. 4 of the drawings, details of the support will be seen. Specifically outer shell post segment 40 supports or otherwise receives inwardly-tapering arm 41, with support tracks or glides being illustrated at 42-42A. It will be noted further that the height dimension of arm 41 is constant, from root to tip. The inner tip of support arm 41 is welded directly to track 42 to provide support therefor. Alternatively, the outer track 42A is segmented, with a short conveyor support segment 42B being provided in notched form to fit directly onto support arm 41 and welded in place thereon. With reference to FIG. 4 of the drawings, a low friction material, 42C, is shown at the conveyor platform support surface interface.

In FIG. 5 there is illustrated a support arm formed as a truncated conical box. The configuration of the support arm of FIG. 5 is the same as that illustrated in FIG. 4, however the arm is made of two individual pieces of steel, such as base element 44, and upper channel-forming element 45. Score lines or bend-lines may be provided.

The present arrangement provides a system which up-scales the design with respect to strength, and achieves the same deflection at the tip as with a conventional design, and with the result being that the maximum stresses in the system are less than in conventional support arms.

While the design of FIG. 5 illustrates a channel member, it will be appreciated that bar stock may be utilized as well. However, there is a significant amount of machining necessary when bar stock is employed, and such operations are frequently time-consuming, labor-intensive, and costly.

As sizes of the structures become smaller or reduced, box or tubular sections may be employed. The parameters of construction are, of course, the same if either solid bar stock is employed or if tubular sections are employed.

In a typical system, the outer dimension of the conveyor system will be approximately sixteen feet in diameter, with the support arms 33-33 having a height of approximately one inch. The root width of such support arms being approximately four inches. This width dimension tapers to one inch at the tip. When fabricated from 10-gauge sheet stainless, the support arms have a weight of approximately 7.5 pounds when thirty-eight inches in overall length.

Among the advantages available from this system include the improved strength, particularly a strength consistent with maximum permissible tip deflection. For example, if the system is designed to accommodate one-quarter inch maximum tip deflection, the cross-section will be selected so that the bending force at the tip would achieve the maximum deflection, and with a uniform and maximum stress being distributed through the entire beam length.

By way of contrast, conventional systems utilizing a more conventional design in the past would chose support arms with a constant dimension, or alternatively a system which tapered along the vertical inter-flight dimension. As can be appreciated, the utilization of a tapered support arm in the inter-flight dimension reduces the effective height of the useful freezing zone and thus places an unnecessary limitation or strain upon the outer dimension of the system.

I claim:

1. In a conveyor system for freezing articles such as food packages comprising a cylindrical core, a generally coaxially arranged cylindrical shell disposed outwardly of said core and with inner and outer walls defining an annular thermal treatment zone therebetween;

(a) a spirally-arranged conveyor platform within said annular zone;

(b) means comprising a plurality of axially and radially spaced apart support arms mounted on one of said walls and supporting said spirally-arranged conveyor platform along a predetermined spiral course through said annular freezing zone;

(c) said support arms being characterized in that:

(1) each of said support arms having an inner end defining a root and an outer end defining a tip and with a certain generally constant height dimension and a generally frusto-conical width dimension tapering inwardly from said root to said tip so as to provide a stable support with a low dimensional profile with the loading stresses within said support arm upon normal weighting of said spirally-arranged conveyor platform being generally constant from root to tip.

2. The conveyor system as defined in claim 1 being particularly characterized in that the weighting of each support arm is such that a uniform and maximum stress is established throughout the length thereof.

3. The conveyor system as defined in claim 1 being particularly characterized in that said support arms have a generally hollow rectangular tubular configuration.

4. The conveyor system as defined in claim 1 being particularly characterized in that said support arms provide a base for mounting of conveyor support rails thereon.

5. The conveyor system as defined in claim 4 being particularly characterized in that said support rails define a conveyor platform support surface interface and wherein a low friction material is provided along said conveyor platform support surface interface.

* * * * *